(12) United States Patent
Hergesheimer et al.

(10) Patent No.: US 11,631,284 B2
(45) Date of Patent: Apr. 18, 2023

(54) SYSTEMS AND METHODS FOR SWITCHING BETWEEN COMMUNICATION AND NAVIGATION MODES IN A TELEMATICS DEVICE

(71) Applicant: CalAmp Corp., Irvine, CA (US)

(72) Inventors: Peter Hergesheimer, Encinitas, CA (US); Steve Burrington, Irvine, CA (US)

(73) Assignee: CalAmp Corp., Irvine, CA (US)

( * ) Notice: Subject to any disclaimer, the term of this patent is extended or adjusted under 35 U.S.C. 154(b) by 258 days.

(21) Appl. No.: 16/748,147

(22) Filed: Jan. 21, 2020

(65) Prior Publication Data

US 2021/0225093 A1 Jul. 22, 2021

(51) Int. Cl.
  *G07C 5/00* (2006.01)
  *G01C 21/12* (2006.01)
  *H04W 4/44* (2018.01)

(52) U.S. Cl.
  CPC ............ *G07C 5/008* (2013.01); *G01C 21/12* (2013.01); *H04W 4/44* (2018.02)

(58) Field of Classification Search
  CPC ......... G07C 5/008; G01C 21/12; H04W 4/44; H04W 4/029
  See application file for complete search history.

(56) References Cited

U.S. PATENT DOCUMENTS

| | | |
|---|---|---|
| 5,365,450 A | 11/1994 | Schuchman et al. |
| 5,396,540 A | 3/1995 | Gooch |
| 5,515,419 A | 5/1996 | Sheffer |
| 5,544,225 A | 8/1996 | Kennedy et al. |
| 5,587,715 A | 12/1996 | Lewis |
| 5,724,243 A | 3/1998 | Westerlage et al. |
| 5,712,899 A | 12/1998 | Pac, II |
| 5,874,889 A | 2/1999 | Higdon et al. |
| 5,890,061 A | 3/1999 | Timm et al. |
| 5,918,180 A | 6/1999 | Dimino |
| 5,959,577 A | 9/1999 | Fan et al. |
| 5,960,337 A | 9/1999 | Brewster et al. |
| 5,986,543 A | 11/1999 | Johnson |
| 6,032,054 A | 2/2000 | Schwinke |
| 6,049,718 A | 4/2000 | Stewart |
| 6,091,956 A | 7/2000 | Hollenberg |
| 6,131,067 A | 10/2000 | Girerd et al. |

(Continued)

OTHER PUBLICATIONS

International Search Report and Written Opinion for Application No. PCT/US20/14385, dated Nov. 2, 2020, 13 pages.

*Primary Examiner* — Mohamed Barakat
*Assistant Examiner* — Sharmin Akhter
(74) *Attorney, Agent, or Firm* — Barnes & Thornburg LLP

(57) ABSTRACT

Embodiments of the invention include a vehicle telematics system including telematics a telematics device, where the telematics device includes a modem that communicates using several communication modes, and the processor of the telematics device is directed to operate in the communication mode, transmit a notification to the cellular data server regarding a switch to a different communication mode, switch to the navigation mode and obtain location data for a first time, switch back to the communication mode, extrapolate a new location for a second time while in the communication mode based on an analysis of the location data received during the navigation mode.

20 Claims, 10 Drawing Sheets

(56) References Cited

U.S. PATENT DOCUMENTS

| | | |
|---|---|---|
| 6,199,045 B1 | 3/2001 | Giniger et al. |
| 6,320,535 B1 | 11/2001 | Hillman et al. |
| 6,339,745 B1 | 1/2002 | Novik |
| 6,347,281 B1 | 2/2002 | Litzsinger et al. |
| 6,677,894 B2 | 1/2004 | Sheynblat et al. |
| 6,847,825 B1 | 1/2005 | Duvall et al. |
| 6,876,858 B1 | 4/2005 | Duvall et al. |
| 2006/0212179 A1 | 9/2006 | Phillips et al. |
| 2007/0182628 A1* | 8/2007 | Pomerantz ............. G01S 19/06 342/357.43 |
| 2012/0140688 A1 | 6/2012 | Hering et al. |
| 2016/0093216 A1 | 3/2016 | Lee et al. |
| 2016/0300404 A1 | 10/2016 | Harter et al. |
| 2018/0302228 A1 | 10/2018 | Hergesheimer |
| 2019/0037362 A1* | 1/2019 | Nogueira-Nine ............................ G06Q 10/0833 |

* cited by examiner

SYSTEMS AND METHODS FOR SWITCHING BETWEEN COMMUNICATION AND NAVIGATION MODES IN A TELEMATICS DEVICE

FIELD OF THE INVENTION

The present invention relates to optimizing the functionality of a telematics devices that incorporates a shared radio architecture that includes a communication interface and a navigation system interface with shared RF and baseband processing, and in particular, to optimizing the switching between the communication interface and the navigation system interface for different device operations.

BACKGROUND

Telematics is the integrated use of telecommunications and informatics. Telematics units can installed in vehicles to provide a variety of telematics functionality in the vehicle and can also be used as asset trackers to track assets. This functionality includes, but is not limited to, fleet monitoring, trip reporting, crash detection, emergency warning systems, navigation functionality, safety warnings, and automated driving assistance, among various other applications. Telematics units are also capable of recording data related to the operation of the vehicle and providing that information for analysis, whether in real-time or during a time when the vehicle is being serviced. This information can be used in a variety of applications, such as crash detection, fleet tracking, shipment tracking, insurance calculations, and in vehicle management and service. Telematics units can include an external interface for mobile communications (e.g., GSM, GPRS, Wi-Fi, WiMax, LTE, among others) and in particular, communication across different types of networks and systems, including cellular networks and Global Navigation Satellite Systems (GNSS). GNSS is a collective term covering various types of satellite navigation technologies, such as the Global Positioning System (GPS), the European Galileo and the Russian GLONASS, among others. Telematics devices can use the different types of networks for different operations, for example, for navigation and location related activities such as trip monitoring, a telematics device can use data from the GNSS network in order to ascertain the location of the device, while cellular data on the cellular network can be used to communicate with a server. Furthermore, different communication protocols can provide different types of information that can be used for a variety of operations within the telematics unites.

SUMMARY OF THE INVENTION

Systems and methods for switching between communication mode and navigation mode in accordance with embodiments of the invention are disclosed. In one embodiment, a telematics device, includes: a processor and a memory storing a telematics application; and a radio that includes a plurality of modes including at least one communication mode and a navigation mode, wherein the radio comprises shared RF and baseband processing for processing signals on the different communication modes; wherein the processor of the telematics device, on reading the telematics application, is directed to: operate in the communication mode; transmit a notification to a remote server system on the communication mode regarding a switch to a different mode; switch to the navigation mode and obtain location data for a first time; switch back to the communication mode; and extrapolate a new location for a second time while in the communication mode based on an analysis of the location data received during the navigation mode.

In another embodiment of the invention, the at least one communication mode communicates cellular data on a cellular network and the navigation mode receives navigation data using the Global Navigation Satellite System (GNSS).

In an additional embodiment of the invention, the processor of the telematics device is further directed to: operate in the navigation mode for a first threshold time period; and switch back to the communication mode after the first threshold time period.

In yet another additional embodiment of the invention, the processor of the telematics device is further directed to: operate in the communication mode for a second threshold time period; and switch to the navigation mode after the second threshold time period.

In still another additional embodiment of the invention, the first threshold time period is different from the second threshold time period.

In yet still another additional embodiment of the invention, the processor of the telematics device is further directed to: begin operating in the navigation mode at the start of a trip monitoring operation to obtain location data regarding an initial location of the telematics device; switch to the communication mode upon obtaining the location data; and transmitting, in the communication mode, the initial location of the telematics device to the remote server system.

In yet another embodiment of the invention, the processor of the telematics device is further directed to: switch to the navigation mode at the end of a trip monitoring operation to obtain location data regarding a final location of the telematics device; switch to the communication mode upon obtaining the location data; and transmitting the final location of the telematics device to the remote server system.

In still another embodiment of the invention, extrapolating a new location includes determining a heading and speed of the telematics device based on an analysis of the location data obtained in navigation mode.

In yet still another embodiment of the invention, the processor is further directed to: operating in a particular mode based on an application executing on the telematics device.

In yet another additional embodiment of the invention, the processor is further directed to: operating primarily in the communication mode; and periodically switching to the GNSS mode to obtain location updates.

In still yet another additional embodiment of the invention the processor is further directed to: switch to the navigation mode upon receiving a request for location information while in the cellular mode.

Still another embodiment of the invention includes a method for switching modes within a telematics device, including: using a radio that includes a plurality of modes including at least one communication mode and a navigation mode, wherein the radio includes shared RF and baseband processing for processing signals on the different communication modes; operate in the communication mode; transmit a notification to a remote server system on the communication mode regarding a switch to a different mode; switch to the navigation mode and obtain location data for a first time; switch back to the communication mode; and extrapolate a new location for a second time while in the communication mode based on an analysis of the location data received during the navigation mode.

In yet another additional embodiment of the invention, the at least one communication mode communicates cellular data on a cellular network and the navigation mode receives location data using the Global Navigation Satellite System (GNSS).

In still another additional embodiment of the invention, operating in the navigation mode for a first threshold time period; and switching back to the communication mode after the first threshold time period; operating in the communication mode for a second threshold time period; and switching to the navigation mode after the second threshold time period.

In yet still another additional embodiment of the invention beginning operation in navigation mode at the start of a trip monitoring operation to obtain location data regarding an initial location of the telematics device; switching to the communication mode upon obtaining the location data; and transmitting the location of the telematics device to the remote server system.

In yet another embodiment of the invention, switching to the navigation mode at the end of a trip monitoring operation to obtain location data regarding a final location of the telematics device; switching to the communication mode upon obtaining the final location data; and transmitting the final location of the telematics device to the remote server system.

In still another embodiment of the invention, extrapolating a new location comprises determining a heading and speed of the telematics device based on the location data.

Yet another embodiment of the invention includes a telematics device, including: a processor and a memory storing a telematics application; and a radio that includes a plurality of modes including at least one communication mode and a navigation mode, wherein the radio comprises shared RF and baseband processing for processing signals on the different communication modes; wherein the processor of the telematics device, on reading the telematics application, is directed to: detect a vehicle start and switch from a low power mode to a normal mode; switch to a navigation mode; determine that a message is to be sent and switch to a communication mode; send the message in the communication mode and switch back to the navigation mode; detect a vehicle turned off event and switch to the communication mode to transmit at least one report and switch to the low power mode.

In yet another additional embodiment of the invention, the processor of the telematics device is further directed to: transmit a notification to a remote server system on the communication mode regarding a switch to a different mode.

In still another additional embodiment of the invention, the at least one communication mode communicates cellular data on a cellular network and the navigation mode receives navigation data using the Global Navigation Satellite System (GNSS).

DETAILED DESCRIPTION

Figure 1:
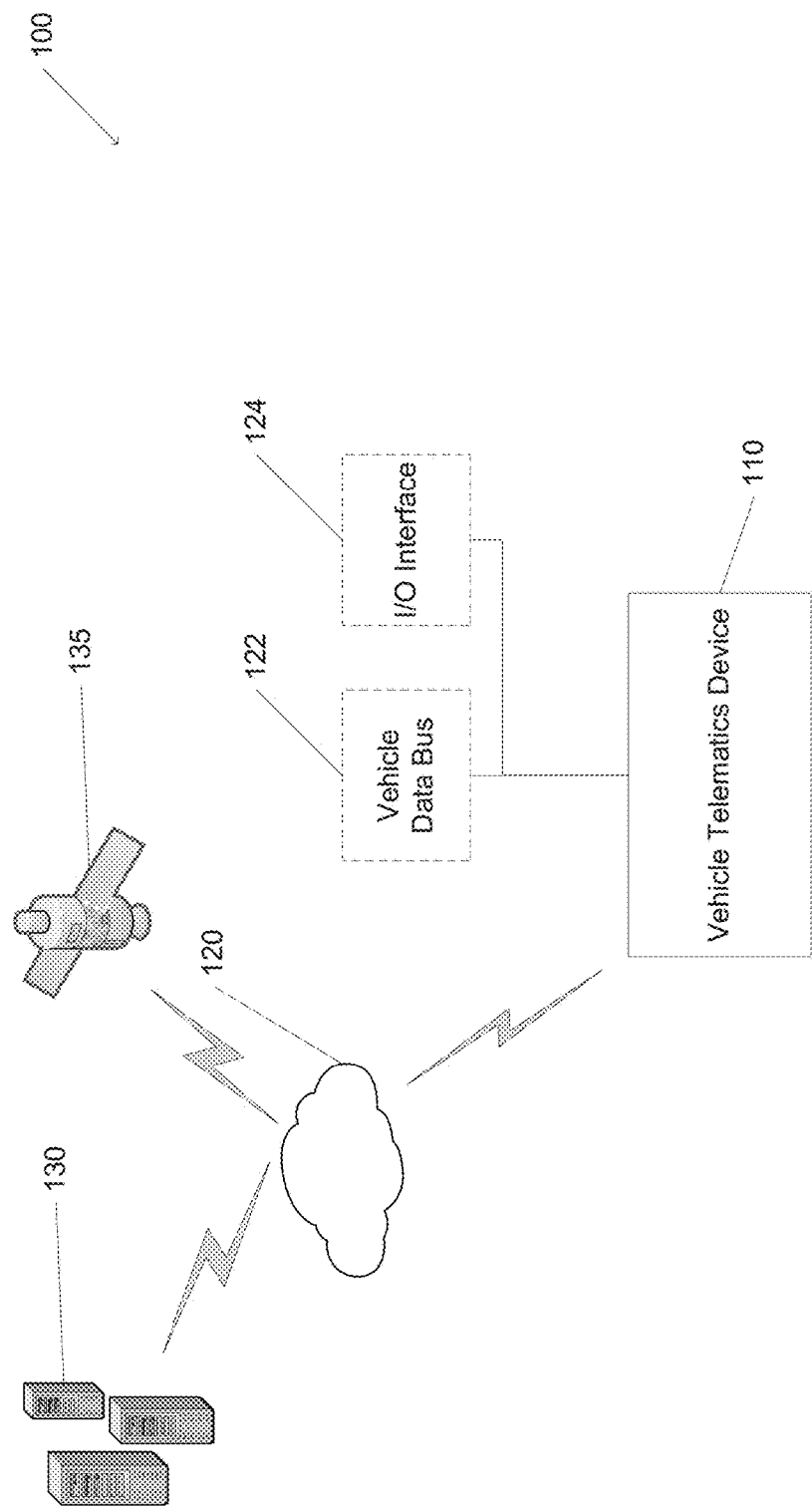
FIG. 1 illustrates a vehicle telematics system in accordance with an embodiment of the invention.

Turning now to the drawings, systems and methods for optimizing the switching between a communication mode and a navigation mode for different telematics and asset tracking operations within a telematics device and/or asset trackers (herein referred to as telematics devices) that includes shared RF and baseband processor in accordance with embodiments of the invention are disclosed.

In many embodiments, a telematics device can be configured to communicate on different types of communication interfaces, including cellular communications on a cellular network. In several embodiments, a telematics device can be configured to include different types of navigation systems for receiving location information, including Global Network Satellite System (GNSS). In many embodiments, the telematics device may include a shared radio that includes shared RF and baseband processing to handle both the communications interface, including cellular, and the navigation system interface, including GNSS signal processing. Due to the shared radio architecture, a radio may process one type of signal from either the communication interface or the navigation system interface at a particular time.

In many embodiments, a telematics device may incorporate a third party shared radio, such as the Qualcomm MDM9205 LTE Modem, providing a combined cellular radio and GNSS receiver, such that the RF and baseband processing and the radio processor are shared between the cellular and GNSS functions.

Incorporating a modem that uses a shared radio architecture may present certain performance constraints on a telematics device that expects to have full-time operation in both the communication mode and the navigation mode for different telematics operations as when one mode is operational, the other is dormant.

In many embodiments, a shared radio can receive and process either cellular data or GNSS data at a particular time and thus the radio may need to be switched to a particular mode (e.g., communication mode, navigation mode, among others) in order to process data for the particular interface. Furthermore, different telematics operations can have different data needs. For example, in an ongoing vehicle trip monitoring operation, a telematics device may need to continuously receive location data while in navigation mode, while a different telematics operation, such as firmware update, may need to continuously receive and process cellular data containing the firmware software package updates. Accordingly, by incorporating a shared radio architecture without a dedicated processor for each of the communication mode and the navigation mode can present certain performance constraints on a device. Accordingly, many embodiments improve the performance of a telematics device incorporating a shared radio by optimizing the switching between the communication mode and the navigation mode to minimize the potential for losses of data packets resulting from simultaneous transmissions of data from different modes to the shared radio.

Accordingly, many embodiments of the telematics device provide for maintaining a high level of performance and that minimizes data losses that may result from having shared processing resources by optimizing the switching across the different modes in order to manage the data needs for different telematics operations (e.g., navigation, firmware updates, trip reporting, among various other telematics operations), and to provide the ability to process wireless signals being received for different modes using a shared radio that includes shared RF and baseband processing which.

In particular, many embodiments of the telematics device optimize the switching functionality between the communication mode (e.g., cellular channel) and the navigation mode (e.g., GNSS) such that the device is able to maintain a high level of functionality for different processes that use data from the communication mode and/or the navigation mode. In order to continue the execution of different telematics operations that rely on different types of data while switching between the different modes, as described in detail below, in many embodiments, the telematics device can periodically switch between a communication mode to a navigation mode while minimizing the loss of communication data while in the navigation mode by providing a notification while on the communication mode to a remote server that the device will be switching between the communication mode and the navigation mode, whereby the remote server can then re-send multiple transmissions of the communication mode data and/or increase the number of re-transmissions of communication mode data being provided to the device in order to increase the probability of the telematics device receiving at least one of the transmissions while switching between the communication mode and navigation modes of operation. In many embodiments, the number of re-transmissions can be configured based on the communication properties of the particular cellular connection, including the geographic location of the telematics device, speed and heading at which the cellular device is traveling, among other factors.

In many embodiments, the telematics device can periodically switch between the communication (e.g., cellular) and navigation (e.g., GNSS) modes, and continue to update a location of the device while in a communication mode by extrapolating the location using previously received location data indicative of a heading and speed of the device that can be used to predict the new location, which can be updated upon receiving new navigation data once the device switches back to navigation mode. In several embodiments, the location information can be used to predict and detect if the device is entering/exiting a geo-fence location, which can be used for a variety of telematics monitoring applications.

In certain embodiments, a telematics device may be operating in certain modes that utilize data primarily from a particular mode, such as the communication mode or the navigation mode, and the device can set the shared radio subsystem to a particular mode for a longer time period and periodically switch to one of the other modes to obtain new data in order to reduce latency for handling future information requests within the different modes.

In certain embodiments, the telematics device may need to perform an accelerometer alignment operation whereby the telematics device may rely on rapid navigation data, in particular to GNSS location data to perform the accelerometer alignment, and thus the telematics device may operate primarily in the GNSS mode. Accordingly, the telematics device may remain in the GNSS mode and switch to a cellular mode on an as needed basis, such as when a report needs to be transmitted across the cellular communication channel. Certain embodiments may switch to a particular mode on an as needed basis, such as when the telematics device receives a request for a report, the telematics device can switch to a cellular mode to provide the report and then switch back to a GNSS mode to monitor the location of the device. Systems and methods for optimizing the switching between a communication mode and a navigation mode for different telematics operations in accordance with embodiments of the invention are described in more detail below.

Vehicle Telematics Systems

Vehicle telematics systems in accordance with embodiments of the invention can communicate with a telematics device installed on a vehicle. A conceptual diagram of a vehicle telematics system in accordance with an embodiment of the invention is shown in FIG. 1. The vehicle telematics system 100 includes a vehicle telematics device 110 that can communicate with a remote server system 130, a vehicle data bus 122, and/or an input/output (I/O) interface 124 as appropriate to the requirements of specific applications of embodiments of the invention. In a variety of embodiments, the vehicle telematics device 110 communicates with the remote server system 130 via a network 120. In a variety of embodiments, the network 120 is the Internet. In many embodiments, the network 120 is any wired or wireless network, such as a cellular network, between the vehicle telematics device 110 and the remote server system 130. In a number of embodiments, the remote server system 130 implemented using a single server system. In several embodiments, the remote server system 130 is implemented using multiple server systems. In a variety of embodiments, the vehicle telematics device 110 communicates with a navigation system 135. In certain embodiments, the navigation system 135 is the Global Navigation Satellite System (GNSS).

In a variety of embodiments, the vehicle telematics device 110 is installed in a vehicle having a vehicle data bus 122. In several embodiments, the vehicle telematics device 110 is installed in a vehicle diagnostic connector that provides access to the vehicle data bus 122. The vehicle telematics device 110 can obtain data from any of a variety of vehicle devices connected to the vehicle data bus 122 utilizing any of a variety of techniques as appropriate to the requirements of specific applications of embodiments of the invention. Vehicle devices can include, but are not limited to, engine sensors, electronic control unit (ECU) devices, alternator sensors, vibration sensors, voltage sensors, oxygen sensors, Global Navigation Satellite System (GNSS) receivers, ignition devices, weight sensors, and/or acceleration determination devices. Systems and methods for connecting to a vehicle data bus that can be utilized in accordance with embodiments of the invention are described in SAE J1978, titled "OBD II Scan Tool," first published by SAE International of Troy, Mich. on Mar. 1, 1992 and last updated Apr. 30, 2002. Systems and methods for obtaining data from devices connected to a vehicle data bus are described in SAE J1979, titled "E/E Diagnostic Test Modes," first published by SAE International on Dec. 1, 1991 and last updated Aug. 11, 2014. The disclosures of SAE J1978 and SAE J1979 are hereby incorporated by reference in their entirety. In a number of embodiments, the vehicle telematics device is connected directly to one or more sensors within the vehicle and/or does not utilize the vehicle data bus 122.

The vehicle telematics device 110 can include any of a variety of sensors and/or devices, including those described above with respect to the vehicle data bus and those described in more detail below, to obtain data regarding the status of the vehicle.

The vehicle telematics device 110 can also communicate with any of a variety of sensors and/or devices using the I/O interface 124. The I/O interface 124 can be any connection, including wired and wireless connections, as appropriate to the requirements of specific applications of embodiments of the invention. In several embodiments, the vehicle telematics device 110 is capable of executing scripts to read data and/or perform particular processes. These scripts can be pre-loaded on the device and/or obtained from the remote server system 130, vehicle data bus 122, and/or the I/O interface 124 as appropriate to the requirements of specific applications of embodiments of the invention. The vehicle telematics device 110 can be self-powered and/or connected into the electrical system of the vehicle in which the vehicle telematics device 110 is installed. In a variety of embodiments, the vehicle telematics device is powered via the vehicle data bus 122 and/or the I/O interface 124. In many embodiments, the vehicle telematics device 110 utilizes an accelerometer in order to detect impact events to the vehicle.

In a variety of embodiments, the vehicle telematics device 110 and/or remote server system 130 provides a user interface allowing for visualizing and interacting with the data. In several embodiments, the vehicle telematics device 110 and/or remote server system 130 provides an interface, such as an application programming interface (API) or web service that provides some or all of the data to third-party systems for further processing. Access to the interface can be open and/or secured using any of a variety of techniques, such as by using client authorization keys, as appropriate to the requirements of specific applications of the invention.

Although a specific architecture of a vehicle telematics system in accordance with embodiments of the invention are discussed above and illustrated in FIG. 1, any of a variety of systems and architectures, including systems related to asset trackers and asset tags and other devices and techniques not specifically described above, can be utilized as appropriate to the requirements of specific applications in accordance with embodiments of the invention. Furthermore, the processes described herein can be performed using any combination the vehicle telematics devices, asset tracker, asset tags, and/or the remote server systems as appropriate to the requirements of specific applications of embodiments of the invention.

Asset Trackers/Telematics Devices

Figure 2:
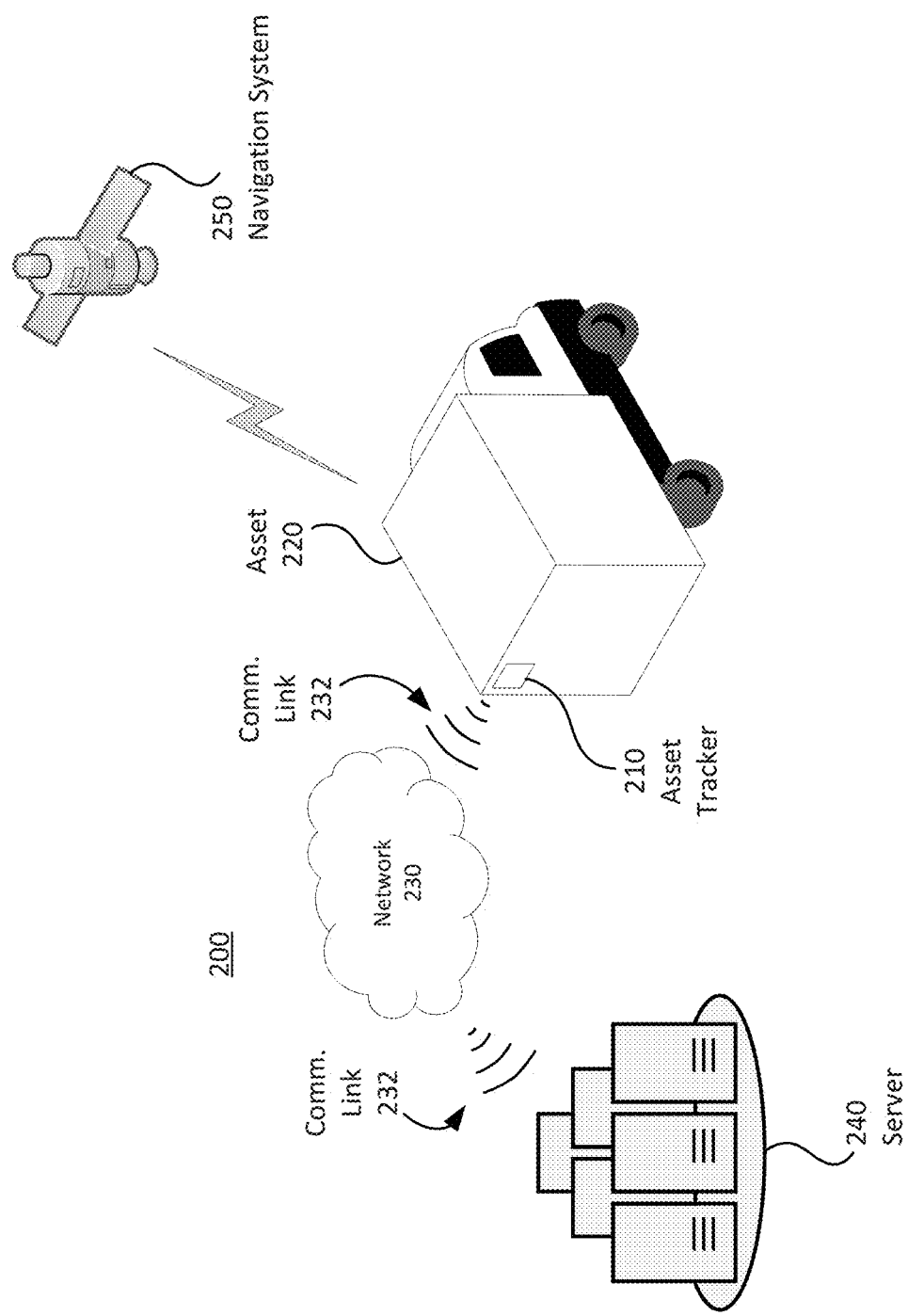
FIG. 2 illustrates a telematics unit for use in an asset tracking system in accordance with an embodiment of the invention.

FIG. 2 illustrates a telematics unit for use in an asset tracking system 200 in accordance with an embodiment of the invention. The asset tracking system 200 includes an asset tracker 210 coupled to an asset 220. The asset tracker 210 is communicatively coupled to a network 230 via a communication link 232. The asset tracker 210 is communicatively coupled to a server 240. The asset tracker 210 communicates asset tracking data to the server 240 via messages that include, among other data, a location of the asset tracker 210. The asset tracker 210 receives location and navigation data from a navigation system 250. In many embodiments, the navigation system is GNSS.

In many embodiments, the asset tracker 210 can switch between different modes, including a communication mode (e.g., cellular mode) and a navigation mode (e.g., GNSS mode), and different operations on the asset tracker can access different communication channels to send/receive different types of data.

In several embodiments, the asset 220 is a trailer, a container, a piece of construction equipment, a power generator, or other assets, especially those that are large and unpowered. The asset tracker 210 may provide various capabilities, such as: asset tracking, theft detection, accident detection, accident reconstruction, asset utilization, door open detection, door close detection, temperature monitoring, refrigeration monitoring, refrigeration control, tire pressure monitoring, load sensing (e.g., volume and weight).

In several embodiments, the asset tracker 210 provides active asset tracking (e.g., transmitting messages, such as multiple messages per hour). In certain embodiments, the asset tracker 110 has a 5-7 year service life. The asset tracker 210 may include a radio subsystem having one or more cellular radios, such as one or more LTE-M (Long Term Evolution for Machines) radios and one or more GNSS radios for communication with the Global Navigation Satellite System (GNSS). In several embodiments, the asset tracker 210 includes advanced telematics components. In certain embodiments, the asset tracker 210 includes a module for obtaining data from a CAN (Controller Area Network) bus of a vehicle. In certain embodiments, the asset tracker 210 includes a serial data transmission port (e.g., an RS-232 port), a communications bus (e.g., a 1-Wire communication bus), and a wireless communications module (e.g., a BLUETOOTH LE transceiver). The asset tracker 110 can be coupled to the asset 220 in any of a variety of ways, such as with screws, bolts, or adhesives. The asset tracker 210 can be sized to fit within a recess (e.g., a valley formed by corrugations of a shipping container) or on a ridge of a corrugated shipping container. In certain embodiments, the asset tracker 210 straddles two or more ridges of a corrugated asset. The asset tracker 110 may be fastenable to a top or side of the asset 220. The asset tracker 210 can have a housing that withstands harsh conditions, particularly those experienced by intermodal shipping containers during transit.

Although specific architectures for asset tracking systems in accordance with embodiments of the invention are conceptually illustrated in FIGS. 2, any of a variety of architectures, including those that store data or applications on disk or some other form of storage and are loaded into memory at runtime, can also be utilized.

Vehicle Telematics Devices

Figure 3:
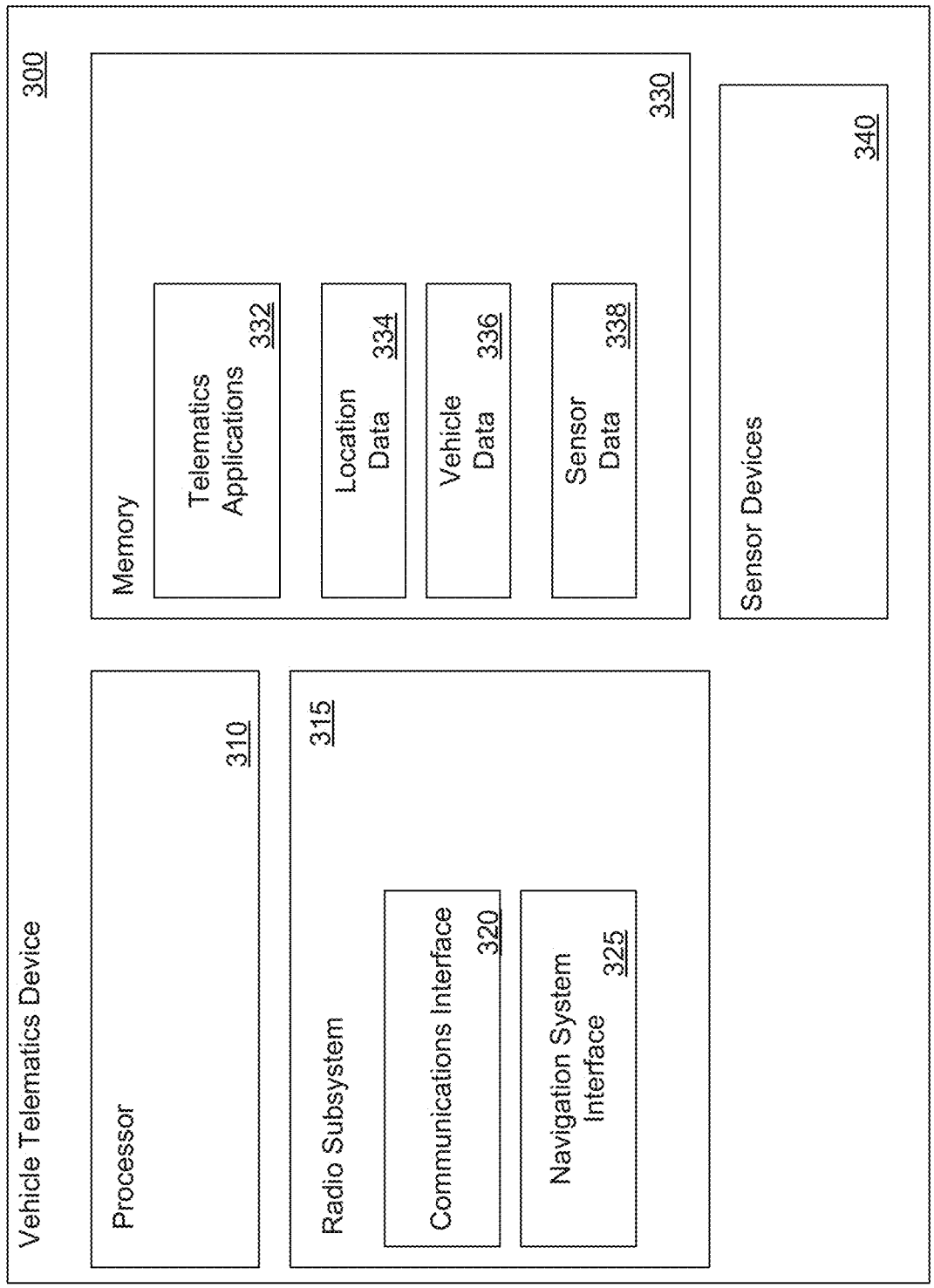
FIG. 3 illustrates a vehicle telematics device with a communication interface and a navigation system interface in accordance with an embodiment of the invention.

Vehicle telematics devices in accordance with embodiments of the invention can transmit and/or receive data from different networks and systems, including cellular and GNSS. A conceptual illustration of a vehicle telematics device with a communication interface and a navigation system interface in accordance with an embodiment of the invention is shown in FIG. 3. The vehicle telematics device 300 includes a processor 310 in communication with memory 330. The vehicle telematics device 300 can also include one or more communication interfaces 320 capable of sending and receiving data. In certain embodiments, the communications interface can include a cellular communications. In a number of embodiments, the communication interface 320 is in communication with the processor 310, the memory 330, the sensor device(s) 340. In several embodiments, the memory 330 is any form of storage configured to store a variety of data, including, but not limited to, a telematics applications 332, location data 334, vehicle data 336, and sensor data 338. Sensor devices 340 can include RPM sensors, voltage sensors, noise sensors, vibration sensors, acceleration sensors such as accelerometer, weight sensors, and any other device capable of measuring data regarding a vehicle as appropriate to the requirements of specific applications of embodiments of the invention. Sensor devices 340, can be included within the vehicle telematics device 300 and/or located external to the vehicle telematics device 300. The vehicle telematics 300 can communicate with external sensor devices using the communications interface 320, such as via a vehicle data bus, I/O interface, and/or a network connection as appropriate to the requirements of specific applications of embodiments of the invention.

In many embodiments, the vehicle telematics device 300 can include a radio subsystem 315 that includes a communications interface 320 for communicating in one or more communication modes and a navigation system interface 325 for obtaining navigation data. In several embodiments, the communications interface 320 can provide communication on a cellular network and the navigation system interface 325 can provide a GNSS interface for obtaining navigation data. Although FIG. 3 illustrates a particular vehicle telematics device architecture with a radio with different modes, any of a variety of architectures, including architectures where the radio subsystem is external to the vehicle telematics device can be utilized as appropriate to the requirements of specific applications in accordance with embodiments of the invention.

Figure 4:
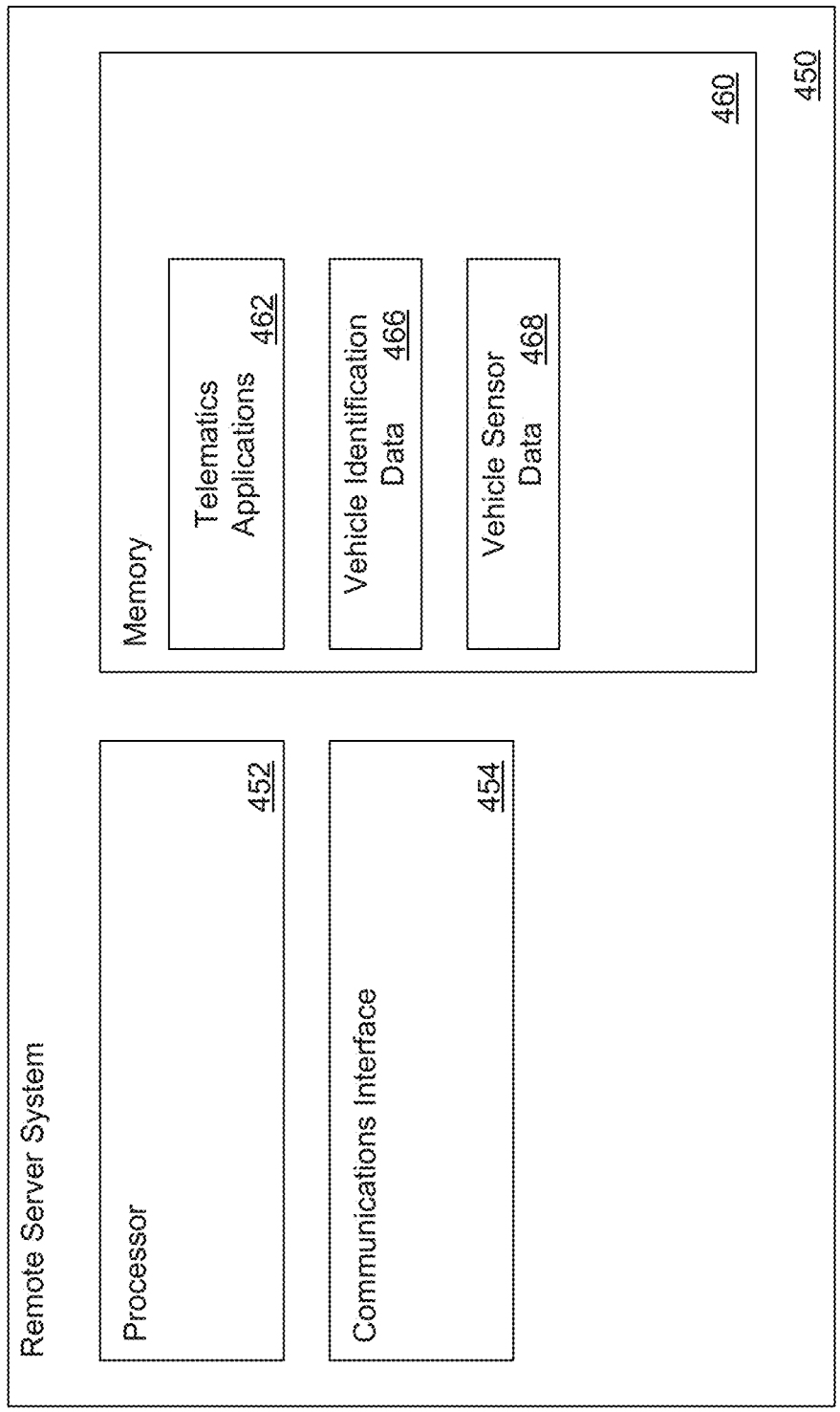
FIG. 4 illustrates a remote server system in accordance with an embodiment of the invention.

Remote server systems in accordance with embodiments of the invention can monitor the operational status and location of a vehicle and/or an asset. A conceptual illustration of a remote server system in accordance with an embodiment of the invention is shown in FIG. 4. In many embodiments, the remote server system 450 includes a processor 452 in communication with memory 460. The remote server system 450 can also include one or more communication interfaces 454 capable of sending and/or receiving data. In a number of embodiments, the communication interface 454 is in communication with the processor 452 and/or the memory 460. In several embodiments, the memory 460 is any form of storage configured to store a variety of data, including, but not limited to, telematics applications 462, vehicle identification data 466, and vehicle sensor data 468. In many embodiments, the telematics applications 462, vehicle identification data 466, and vehicle sensor data 468, are stored using an external server system and received by the remote server system 450 using the communications interface 454.

The processor 410 and processor 452 can be directed, by the vehicle telematics applications 432 and the telematics application 462 respectively, to perform a variety of telematics processes. Telematics processes can include obtaining data from a variety of sensor devices, determining data regarding the state of the vehicle, and using the vehicle data to determine if the vehicle has entered or exited a geo-fence.

Although specific architectures for vehicle telematics devices and remote server systems in accordance with embodiments of the invention are conceptually illustrated in FIGS. 3-4, any of a variety of architectures, including those that store data or applications on disk or some other form of storage and are loaded into memory at runtime, can also be utilized. Additionally, any of the data utilized in the system can be cached and transmitted once a network connection (such as a wireless network connection via the communications interface) becomes available. In a variety of embodiments, a memory includes circuitry such as, but not limited to, memory cells constructed using transistors, that are configured to store instructions. Similarly, a processor can include logic gates formed from transistors (or any other device) that dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices.

Integrated Asset Tracker

Figure 5:
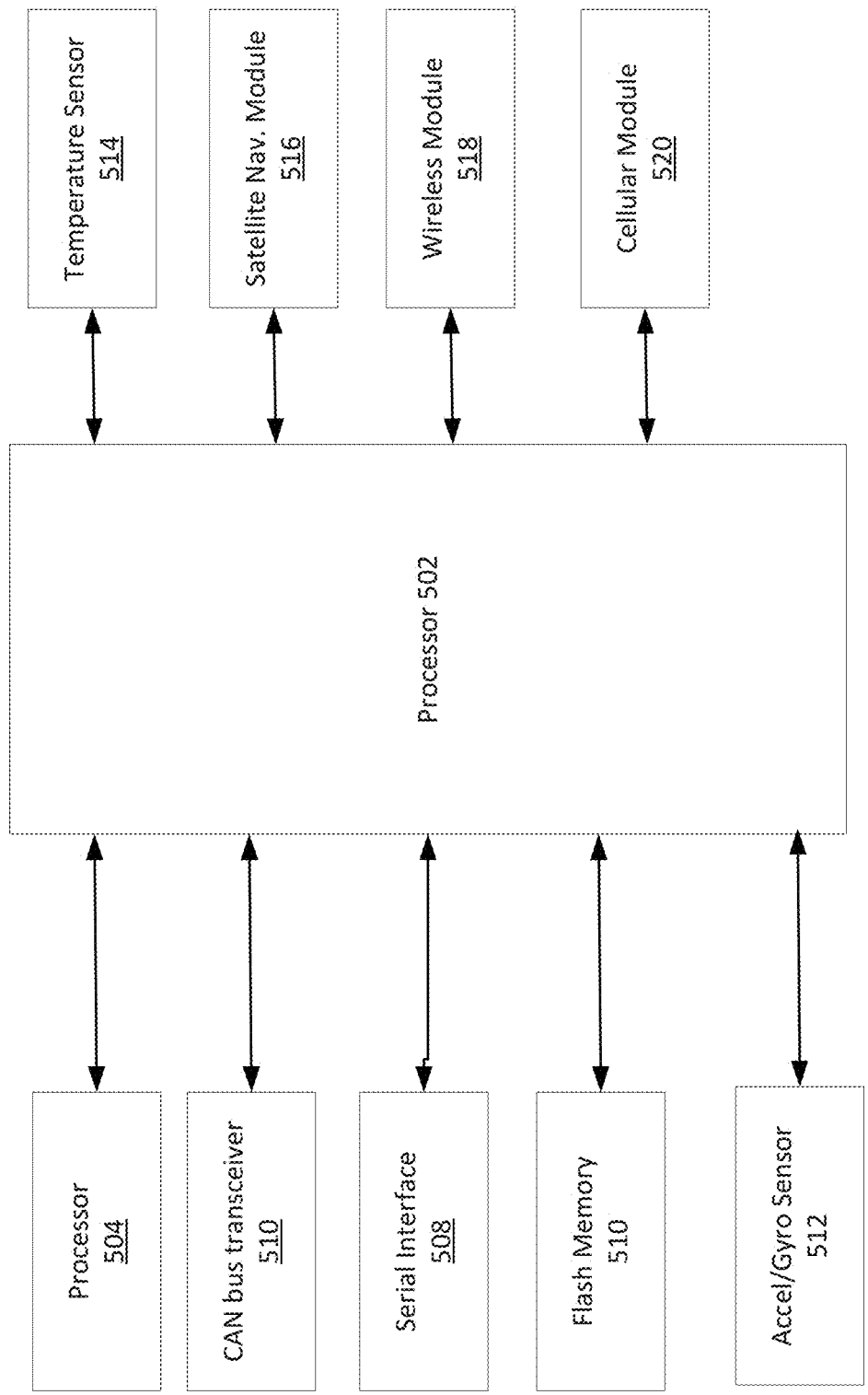
FIG. 5 illustrates a block circuit diagram of components of an integrated asset tracker/telematics device in accordance with an embodiment of the invention.

FIG. 5 illustrates a block circuit diagram of components of an integrated asset tracker/telematics device in accordance with an embodiment of the invention. The block circuit diagram illustrates components that cooperate to provide one or more capabilities of the integrated asset tracker, including a processor 502 (e.g., an STM32L496VG or STM32L4A6VG from STMICROELECTRONICS) a communication bus module 3304 (e.g., a 1-Wire communication bus module, such as a DS2484R+T from MAXIM INTEGRATED) connected to the processor over an I2C bus, a CAN bus transceiver 506 (e.g., a CAN H/L MCP2562T-E/MF from MICROCHIP TECHNOLOGY INC.), a serial interface 508 (e.g., a MAX3218EAP RS-232 interface from MAXIM INTEGRATED) with Universal Asynchronous Receiver-Transmitter (UART) support, flash memory 510 (e.g., a W25Q16FWUXIE flash memory module from WINBOND ELECTRONICS) connected via a Serial Peripheral Interface (SPI), an accelerometer and gyroscopic sensor 512 (e.g., an LSM6DSL chip from STMICROELECTRONICS) connected via SPI, a temperature sensor 514 (e.g., a STTS751 temperature sensor by STMICROELECTRONICS) connected via SPI, a satellite navigation module 516 (e.g., a UBX-M8030 from U-BLOX HOLDING AG) connected via UART, a wireless module 518 (e.g., a BLUETOOTH wireless module, such as a BLUENRG-2 module from STMICROELECTRONICS) connected over UART, a cellular module 520 (e.g., a BG96 module or EG91 module from QUECTEL WIRELESS SOLUTIONS CO.) connected via UART. Although FIG. 5 illustrates a particular circuit diagram of various components of an asset tracker, any of a variety of components may be specified as appropriate to the requirements of specific applications in accordance with embodiments of the invention.

Software Architecture

Figure 6:
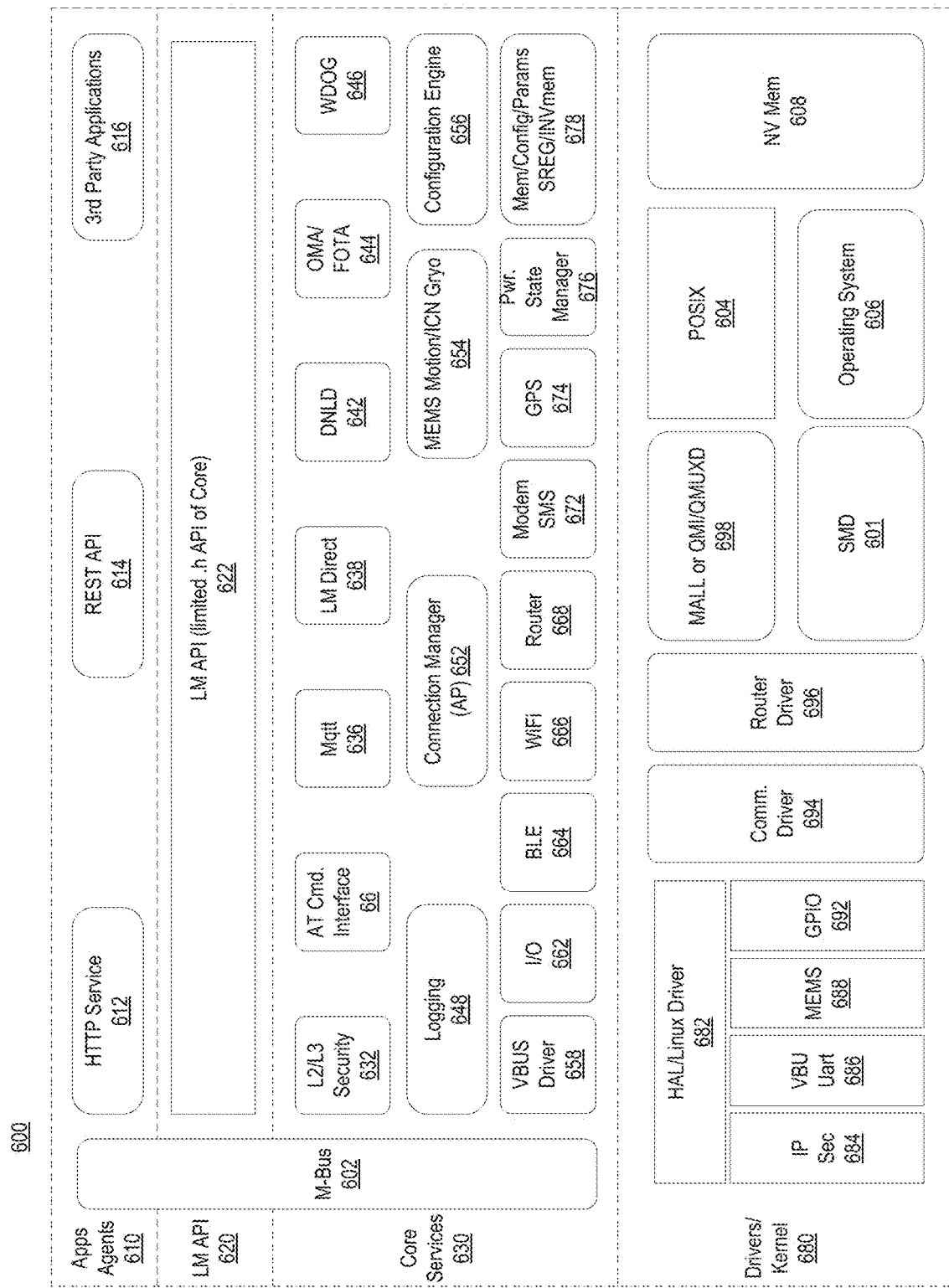
FIG. 6 illustrates a software architecture for use with asset trackers and telematics devices in accordance with an embodiment of the invention.

FIG. 6 illustrates a software architecture 600 for use with asset trackers and telematics devices described herein in accordance with an embodiment of the invention. The software architecture 600 is an example software architecture for providing one or more of the features and capabilities of the asset tracker and/or telematics device. The software architecture 600 includes a message bus 602, an application/agent layer 610, an LM API layer 620, a core services layer 630, and a driver/kernel layer 680. The application/agent layer 610 includes an HTTP service 612, a REST API 614, and 3rd party applications 616. The LM API layer 620 includes an LM API 622 (e.g., a limited header API of the core services). The core services layer 630 includes an L2/L3 security service 632, an AT command interface service 634, an MQTT (Message Queuing Telemetry Transport) service 636, an LM direct service 638, a DNLD service 642, an OMA/FOTA service 644, a WDOG service 646, a logging service 648, a connection manager service 652, a MEMS motion/ICN Gyro service 654, a configuration engine 656, a VBUS driver 658, an I/O service 662, a BLUETOOTH LE service 664, a WIFI service 666, a router service 668, a modem SMS service 672, a GPS service 674, a power state manager service 676, and a memory/configuration/parameter SREG INVmem service 678. The drivers/kernel layer 680 includes a HAL (Hardware Abstraction Layer)/Linux driver, an IP sec module 684, a VBU UART module 686, a MEMS module 688, a GPIO module 692, communication drivers 694 (e.g., drivers for HOSTAP, WIFI, or BLUETOOTH LE), a router driver 696 (e.g., IPTABLES), MALL/QMI/QMUXD drivers 698, SMD drivers 601, a POSIX interface 604, an operating system 606 (e.g., a LINUX operating system or a real time operating system such as THREADX), and an NV memory module 608. An asset tracker can use the configuration engine 656 and one or more scripts to perform one or more asset tracking or communication mode (e.g., cellular) and navigation mode (e.g., GNSS) switching processes. Although FIG. 6 illustrates a particular software architecture of an asset tracker/telematics device, any of a variety of software architectures for the asset tracker may be utilized as appropriate to the requirements of specific applications in accordance with embodiments of the invention.

Shared Cellular and GNSS Architecture

Figure 7:
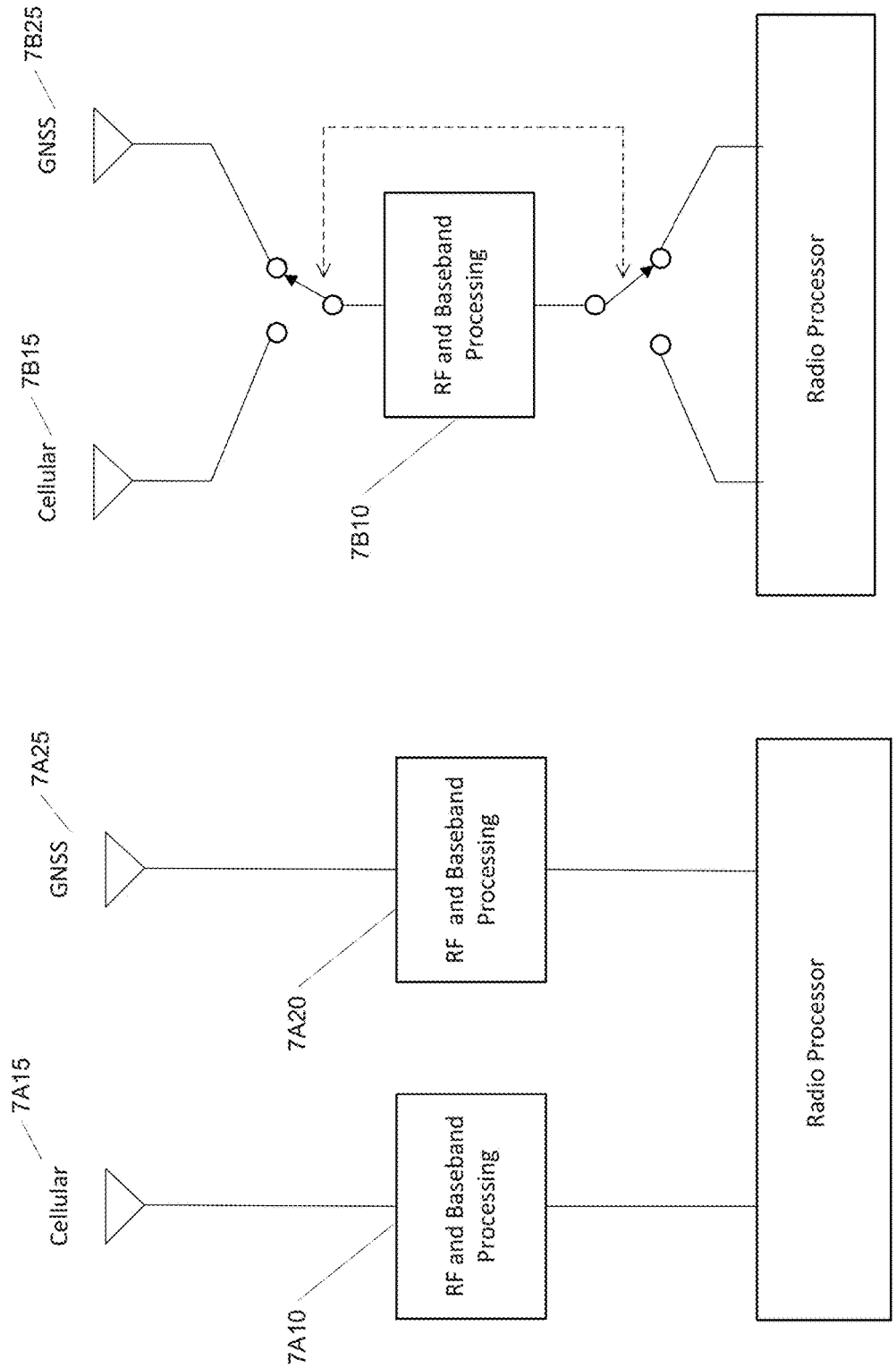
FIG. 7A illustrates a radio subsystem with an independent RF and baseband processing architecture in accordance with an embodiment of the invention.
FIG. 7B illustrates a radio subsystem with shared RF and baseband processing for handling cellular and GNSS data in accordance with an embodiment of the invention.

As described above, in many embodiments, a telematics device and/or asset tracker may incorporate a radio subsystem that includes shared RF and baseband processing for communication in a communications mode (e.g., cellular) and a navigation mode (e.g., GNSS). Unlike the shared radio architecture, radio architectures may include independent RF and baseband processing for each mode whereby the radio would be able to simultaneously operate in both the communication mode and the navigation mode. FIG. 7A illustrates a radio subsystem with an independent RF and baseband processing architecture and FIG. 7B illustrates a radio subsystem with shared RF and baseband processing for handling cellular and GNSS data. In particular, FIG. 7A illustrates an independent radio architecture that provides for separate RF and baseband processing, including RF and baseband processing module 7A10 to handle cellular communications 7A15 and RF and baseband processing module 7A20 to handle GNSS 7A25 communications. By providing the separate RF and baseband processing modules for each mode (e.g., cellular and navigation mode), both the cellular radio and GNSS data can be fully operational at all times. However, to improve the power consumption requirements and reduce the cost, many embodiments of the telematics device may incorporate a radio subsystem architecture that includes a shared RF and baseband processing module for handling both cellular and GNSS data, as illustrated in FIG. 7B, whereby RF and baseband processing module 7B10 can be used to handle both a communication mode (e.g., cellular data communication 7B15 and a navigation mode including GNSS communications 7B25. Accordingly, using a shared radio architecture, many embodiments of the telematics device also optimize the switching between the different radio modes, including the cellular mode 7B15 and the GNSS mode 7B25 for different telematics operations in order to minimize potential data losses that may arise from simultaneous data transmissions on the different modes. Described below are switching processes that may be used to switch between different radio modes by telematics devices in accordance with many embodiments of the invention for different telematics operations.

Switching Between Cellular and GNSS Mode During Location Monitoring

In many embodiments, a telematics device may be executing concurrent operations that may need continuous access to communication data, such as cellular data and navigation data, such as GNSS data. In particular, a telematics device may be continuously monitoring a location of a device such as for a vehicle trip reporting application, and at the same time be using cellular data for a variety of operations such as cellular communications or reporting trip data to a server. Accordingly, many embodiments of the telematics device are able to continue to update a location of a device even when a radio subsystem is operating in a cellular mode by extrapolating a location based on prior GNSS fixes using speed and heading information, and likewise minimizing cellular data loss while switching between cellular and GNSS modes by notifying a server of the forthcoming switching between modes, whereby a server can configure the data transmission settings to re-transmit cellular data a number of times to increase the probability that the data will be received by the telematics device.

Figure 8:
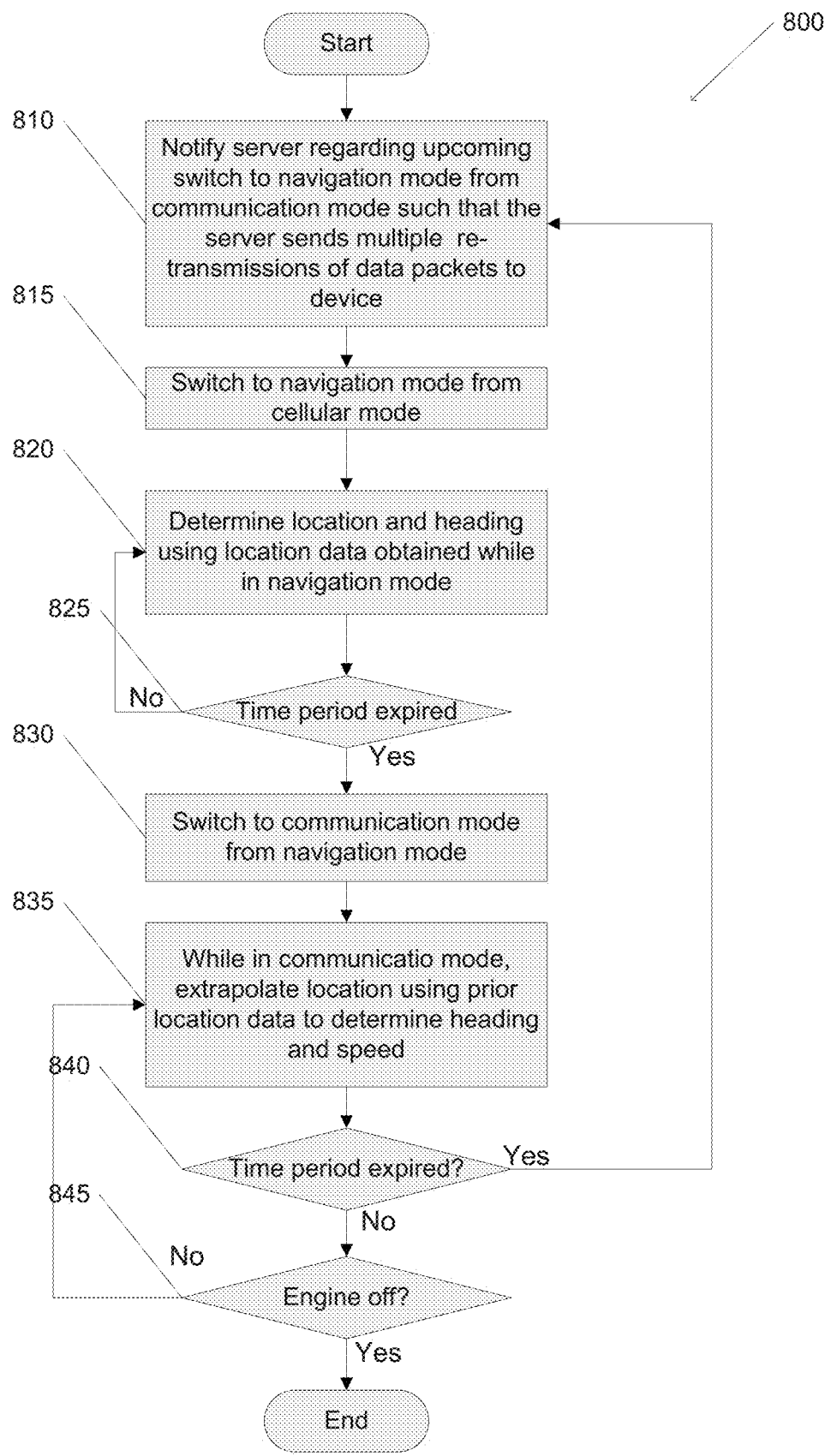
FIG. 8 illustrates a process for switching between a communication mode (e.g., cellular) and a navigation mode (e.g., GNSS) while providing location updates in accordance with an embodiment of the invention.

A process for switching between a communication mode (e.g., cellular) and a navigation mode (e.g., GNSS) while providing location updates in accordance with an embodiment of the invention is illustrated in FIG. 8. The process notifies (810) a server regarding an upcoming switch to a navigation mode from a communication mode such that the server can configure the data transmission settings to send multiple re-transmissions of data packets to the telematics device while the device is in the switching mode of operation. In many embodiments, the number of times a server may set to re-transmit cellular data can be based on the anticipated amount of time that a telematics device will be operating in a navigation mode. For example, if a device is in GNSS mode for a period of two seconds, the server can re-transmit cellular data at a rate that will account for a device being unavailable to receive the cellular data for at least two seconds. In several embodiments, a server may continue transmitting the cellular data until it receives an indication from the device that it is again operating in a cellular mode. The process switches (815) to navigation mode from communication mode and obtains a navigation location data fix. The process determines (820) a location and heading of the telematics device using the location data obtained while in navigation mode. In several embodiments, the process can determine a heading and speed of the telematics device based on an analysis of a series of location data and corresponding time stamps to determine the velocity of the vehicle and the direction it is traveling.

The process determines (825) if a time period has expired, and if so, switches back to the communication mode from the navigation mode. In many embodiments, the time period can be configured based on the requirements of particular applications and to maintain at least a threshold level of communication data transmission, such as maintaining a 50% cellular data transmission capability. In certain embodiments, the process can switch to a communication mode after any of a number of determinations, including immediately after obtaining the required navigation location data for the location determinations. In several embodiments, the process can switch to a communication mode using any of a variety of thresholds, such as obtaining a requisite level of navigation location data, as appropriate to the requirements of specific applications in accordance with embodiments of the invention.

The process, while in communication mode, extrapolates (835) a location using the navigation data heading and speed data derived from the navigation fix data. In many embodiments, the process can use the newly identified location to determine whether a device has entered and/or exited a geofence. The process determines (840) if a time period has expired, and if so, proceeds to step 810. In many embodiments, the time period can be configured based on the requirements of specific applications. In several embodiments, the time period can be dynamically adjusted during run time based on the computational characteristics of the telematics device and the particular operational needs of the particular telematics application. In several embodiments, different sets of priorities may be assigned to different telematics applications, and those with a higher priority may be able to switch to a particular communication channel to obtain data over applications assigned a lower priority.

If the time period has not expired, the process determines (845) if the vehicle engine has been turned off, and if not, reiterates to step 835, and if so, the process completes.

Specific processes for switching between a communication mode and a navigation mode while providing location updates in accordance with embodiments of the invention are described above and shown with respect to FIG. 8; however, any number of processes can be utilized as appropriate to the requirements of a specific applications in accordance with embodiments of the invention.

Switching Between Cellular and GNSS for On-Demand Location Requests

In many embodiments, a device may be used for a buy-here-pay-here market, where location can be on-demand, as such, the device may be operating in a communication mode (e.g., cellular mode) for a longer time period than the navigation mode (e.g., GNSS mode) during normal operations. In many embodiments, the device may be set to operate primarily in a cellular mode and occasionally switch to GNSS mode to obtain a GNSS fix and switch back to cellular mode.

Figure 9:
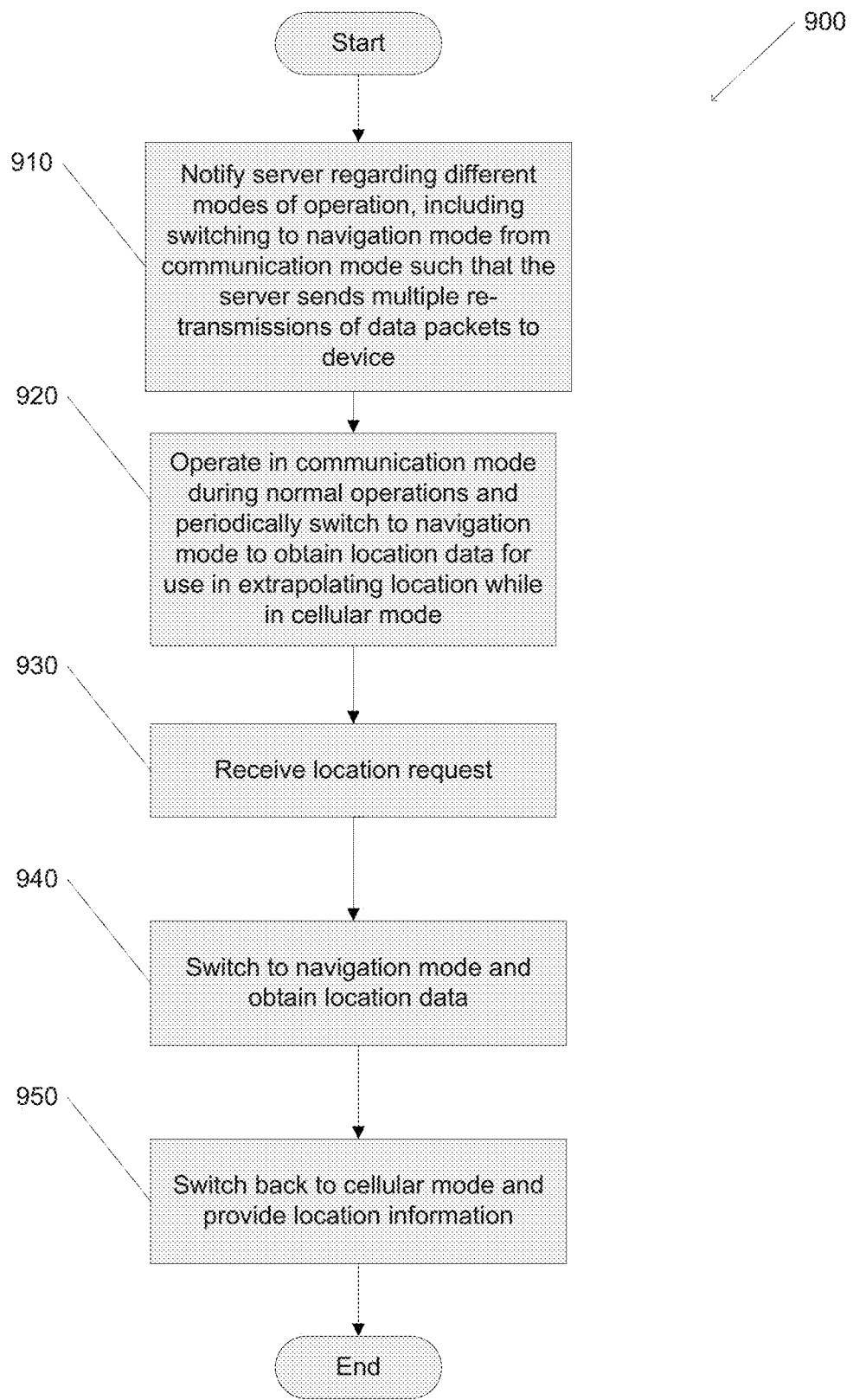
FIG. 9 illustrates a process for operating in communication mode and switching to navigation mode to handle location requests in accordance with an embodiment of the invention.

Accordingly, a device may spend the majority of its time waiting for cellular data packets from a server, and service location requests on an on-demand basis, whereby the device can switch to a navigation mode upon receiving a location request in order to obtain location data and switch back to communication mode to provide the location information to a server. In certain embodiments, the telematics device can spend the majority of time in a communication mode, and periodically switch to navigation mode to obtain location data to reduce the latency for future location requests. A process for operating in communication mode and switching to navigation mode to handle location requests in accordance with an embodiment of the invention is illustrated in FIG. 9.

The process operates in communication mode during normal operations and periodically switches to navigation mode to obtain location data for use in extrapolating the location while in communication mode. The process receives (920) a location request. In many embodiments, a location request may be periodically received in order to monitor a location of a device. The process notifies (930) a server regarding an upcoming switch to a navigation mode from the communication mode such that the server can configure multiple re-transmissions of data packets to the device to minimize data loss during the switching operations. The process switches (940) to navigation mode and obtains location data. The process switches (950) back to the communication mode and provides location information to the server. In certain embodiments, the process may remain in the navigation mode for a threshold time period and switch back to the communication mode after expiration of the time period.

Specific processes for operating in communication mode and switching to navigation mode to handle location requests in accordance with embodiments of the invention are described above and shown with respect to FIG. 9; however, any number of processes can be utilized as appropriate to the requirements of a specific application in accordance with embodiments of the invention.

Figure 10:
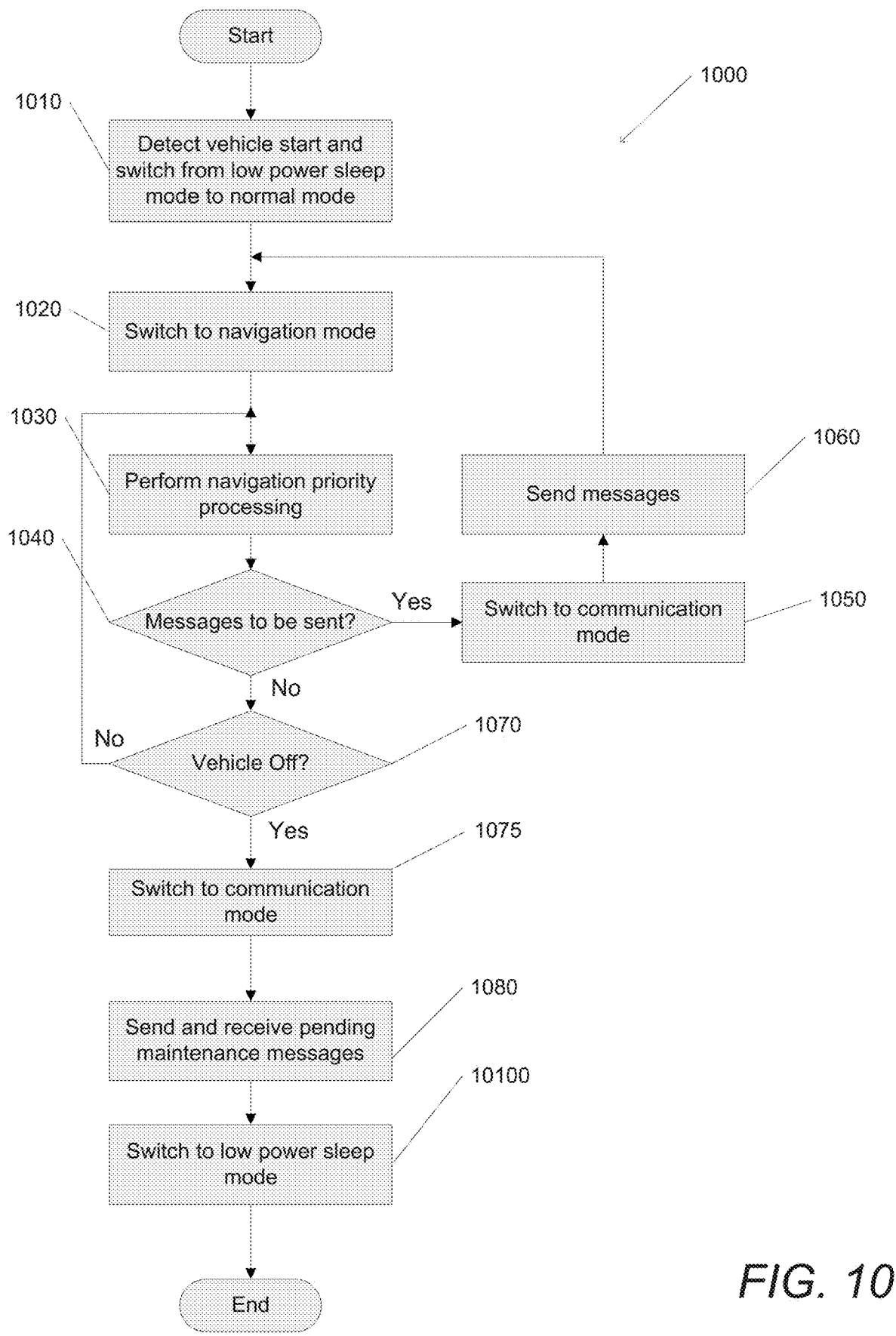
FIG. 10 illustrates a process for operating primarily in navigation mode and switching to communication mode to transmit reports in accordance with an embodiment of the invention.

Switching Between Communication Mode and Navigation Mode for Trip-Start Trip-End Reporting In several embodiments, a telematics device may be used for trip reporting operation where a device is expected to report the start and end of each trip. Accordingly, a shared radio of a telematics device can be set to operate primarily in the navigation mode, and switch to communication mode at the start and end of each trip to report the location information. A process for operating primarily in navigation mode and switching to communication mode to transmit reports in accordance with an embodiment of the invention is illustrated in FIG. 10.

The process detects (1010) a vehicle start and switches from a low power sleep mode to a normal mode. The process switches (1020) to navigation mode. In many embodiments, the navigation mode includes receiving location data from GNSS. The process performs (1030) navigation priority processing. For example, during a vehicle startup, a telematics device may perform an accelerometer alignment operation which may need rapid access to new GNSS location data in order to align the accelerometer with the vehicle axes. Different telematics operations may use primarily either GNSS data or cellular data, and based on the type of data, the process can select as the primary mode of operation one of either GNSS mode or cellular mode for the telematics device while the particular telematics operation is executing.

The process determines (1040) is messages are to be sent. If messages are to be sent, the process switches (1050) to communication mode and sends (1060) the messages and re-iterates to 1020. In many embodiments, the process may provide location information to a server through the communication mode and then returns to navigation mode. If there are not any messages to be sent, the process determines (1070) if the vehicle has been turned off. If the vehicle has not been turned off, the process re-iterates to 1030. If the vehicle has been turned off indicating a trip-end, the process switches (1075) to communication mode and sends and/or receives (1080) pending maintenance messages. In many embodiments, the process may send and receive different types of reports, such as trip reports, maintenance reports, vehicle operation reports, driver behavior reports, among others as appropriate to the requirements of specific applications, and the process can delay the transmission of these reports until after a vehicle completes a trip. The process switches (1090) to low power sleep mode. The process ends.

Specific processes for operating primarily in navigation mode and switching to communication mode to handle transmission of reports in accordance with embodiments of the invention are described above and shown with respect to FIG. 10; however, any number of processes can be utilized as appropriate to the requirements of a specific application in accordance with embodiments of the invention.

Although the present invention has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. It will be evident to the person skilled in the art to freely combine several or all of the embodiments discussed here as deemed suitable for a specific application of the invention. Throughout this disclosure, terms like "advantageous", "exemplary" or "preferred" indicate elements or dimensions which are particularly suitable (but not essential) to the invention or an embodiment thereof, and may be modified wherever deemed suitable by the skilled person, except where expressly required. Accordingly, the scope of the invention should be determined not by the embodiments illustrated, but by the appended claims and their equivalents.

What is claimed is:

1. A telematics device, comprising:
a processor and a memory storing a telematics application; and
a radio that includes a plurality of modes including at least one communication mode and a navigation mode, wherein the radio comprises shared RF and baseband processing for processing signals on the different communication modes;
wherein the processor of the telematics device, on reading the telematics application, is directed to:
operate in the communication mode;
transmit a notification to a remote server system on the communication mode that indicates the telematics device will switch to the navigation mode;
switch to the navigation mode subsequent to transmission of the notification and obtain location data for a first time;
switch back to the communication mode; and
extrapolate a new location for a second time while in the communication mode based on an analysis of the location data received during the navigation mode.

2. The telematics device of claim 1, wherein the at least one communication mode communicates cellular data on a cellular network and the navigation mode receives navigation data using the Global Navigation Satellite System (GNSS).

3. The telematics device of claim 1, wherein the processor of the telematics device is further directed to:
operate in the navigation mode for a first threshold time period; and
switch back to the communication mode after the first threshold time period.

4. The telematics device of claim 3, wherein the processor of the telematics device is further directed to:
operate in the communication mode for a second threshold time period; and
switch to the navigation mode after the second threshold time period.

5. The telematics device of claim 4, wherein the first threshold time period is different from the second threshold time period.

6. The telematics device of claim 1, wherein the processor of the telematics device is further directed to:
begin operating in the navigation mode at the start of a trip monitoring operation to obtain location data regarding an initial location of the telematics device;
switch to the communication mode upon obtaining the location data; and
transmitting, in the communication mode, the initial location of the telematics device to the remote server system.

7. The telematics device of claim 1, wherein the processor of the telematics device is further directed to:
switch to the navigation mode at the end of a trip monitoring operation to obtain location data regarding a final location of the telematics device;
switch to the communication mode upon obtaining the location data; and
transmitting the final location of the telematics device to the remote server system.

8. The telematics device of claim 1, wherein extrapolating a new location comprises determining a heading and speed of the telematics device based on an analysis of the location data obtained in navigation mode.

9. The telematics device of claim 1, wherein the processor is further directed to:
operating in a particular mode based on an application executing on the telematics device.

10. The telematics device of claim 1, wherein the processor is further directed to:
operating primarily in the communication mode; and
periodically switching to the GNSS mode to obtain location updates.

11. The telematics device of claim 9, wherein the processor is further directed to:
switch to the navigation mode upon receiving a request for location information while in the communication mode.

12. A method for switching modes within a telematics device, comprising:
using a radio that includes a plurality of modes including at least one communication mode and a navigation mode, wherein the radio comprises shared RF and baseband processing for processing signals on the different communication modes;
operate in the communication mode;
transmit a notification to a remote server system on the communication mode that indicates the telematics device will switch to the navigation mode;
switch to the navigation mode subsequent to transmission of the notification and obtain location data for a first time;
switch back to the communication mode; and
extrapolate a new location for a second time while in the communication mode based on an analysis of the location data received during the navigation mode.

13. The method of claim 12, wherein the at least one communication mode communicates cellular data on a cellular network and the navigation mode receives location data using the Global Navigation Satellite System (GNSS).

14. The method of claim 12, further comprising:
operating in the navigation mode for a first threshold time period; and
switching back to the communication mode after the first threshold time period;
operating in the communication mode for a second threshold time period; and
switching to the navigation mode after the second threshold time period.

15. The method of claim 12, further comprising: beginning operation in navigation mode at the start of a trip monitoring operation to obtain location data regarding an initial location of the telematics device; switching to the communication mode upon obtaining the location data; and transmitting the location of the telematics device to the remote server system.

16. The method of claim 12, further comprising: switching to the navigation mode at the end of a trip monitoring operation to obtain location data regarding a final location of the telematics device; switching to the communication mode upon obtaining the final location data; and transmitting the final location of the telematics device to the remote server system.

17. The method of claim 12, wherein extrapolating a new location comprises determining a heading and speed of the telematics device based on the location data.

18. A telematics device, comprising:
- a processor and a memory storing a telematics application; and
- a radio that includes a plurality of modes including at least one communication mode and a navigation mode, wherein the radio comprises shared RF and baseband processing for processing signals on the different communication modes;
- wherein the processor of the telematics device, on reading the telematics application, is directed to:
  - detect a vehicle start and switch from a low power mode to a normal mode;
  - switch to a navigation mode;
  - determine that a message is to be sent and switch to a communication mode;
  - send the message in the communication mode, send a notification that indicates the telematics device will switch to the navigation mode, and switch back to the navigation mode subsequent to the sending of the notification;
  - detect a vehicle turned off event and switch to the communication mode to transmit at least one report and switch to the low power mode.

19. The telematics device of claim 18, wherein the processor of the telematics device is further directed to:
- transmit a notification to a remote server system on the communication mode regarding a switch to a different mode.

20. The telematics device of claim 18, wherein the at least one communication mode communicates cellular data on a cellular network and the navigation mode receives navigation data using the Global Navigation Satellite System (GNSS).

* * * * *